UNITED STATES PATENT OFFICE.

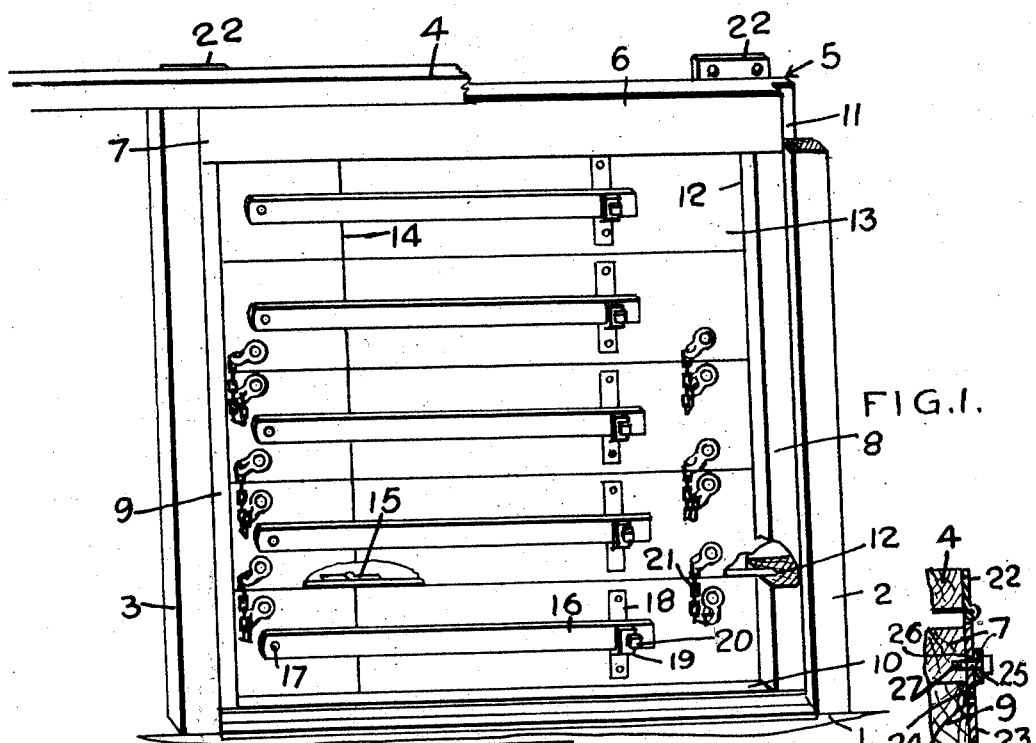
FIG.1.
FIG.5.
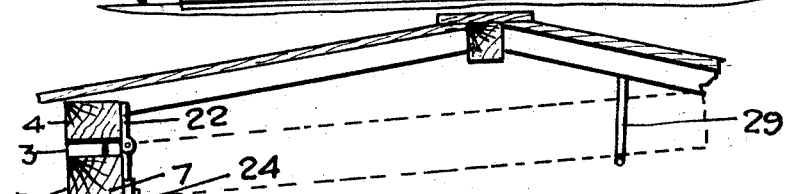
FIG.2.
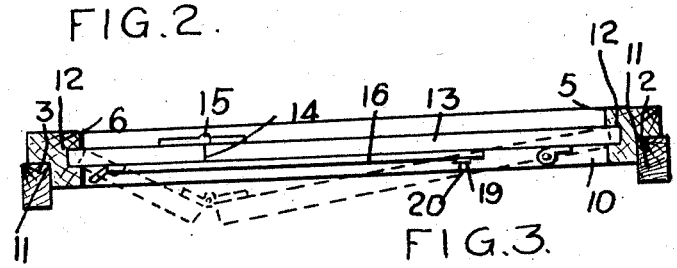
FIG.3.
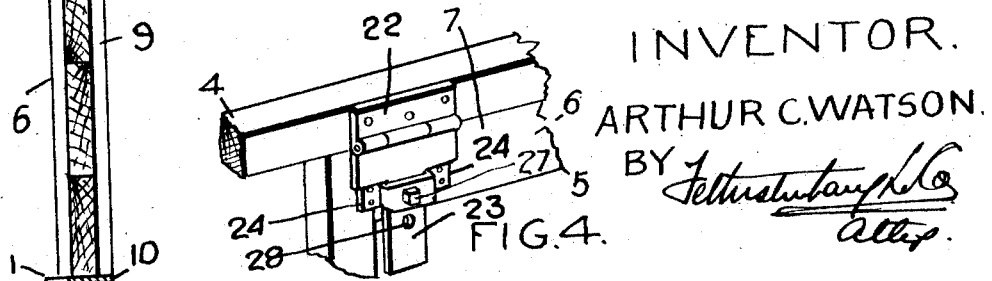
FIG.4.
INVENTOR.
ARTHUR C. WATSON.

ARTHUR COULSON WATSON, OF SARNIA, ONTARIO, CANADA.

GRAIN-CAR DOOR.

1,415,746.   Specification of Letters Patent.   Patented May 9, 1922.

Application filed May 5, 1921. Serial No. 467,155.

*To all whom it may concern:*

Be it known that I, ARTHUR COULSON WATSON, a subject of the King of Great Britain, of the city of Sarnia, in the county of Lambton, in the Province of Ontario, Canada, have invented certain new and useful Improvements in Grain-Car Doors, of which the following is the specification.

My invention relates to improvements in grain car doors and the object of the invention is to devise a simple construction of door by which the outward pressure of the grain or other commodity contained in the car may be easily relieved when starting to unload, and it consists essentially of the arrangement and construction of parts as hereinafter more particularly explained.

Fig. 1 is a perspective view of my car door showing it applied to a car door opening.

Fig. 2 is a cross sectional view through a portion of a car and my door showing the door in the closed position in full lines and in the open position in dotted lines.

Fig. 3 is a plan view of my car door, the side posts of the car door opening being shown in section.

Fig. 4 is an enlarged perspective detail of the hinged connection between my door and the frame of a car.

Fig. 5 is a vertical section through Fig. 4.

In the drawings like characters of reference indicate corresponding parts in each figure.

1 indicates the sill of a car, 2 and 3 the side posts and 4 the top plate. The sill, side posts and top plate form the door opening of the car. 5 is my grain door which is formed by an outer frame 6. The frame 6 is formed by an upper timber 7, and side timbers 8 and 9 connected at their upper ends to the upper timber 7 and having their lower ends connected together by a metal plate 10 which rests upon the floor of the car. Each vertical edge of my grain car door 5 is provided with a rabbet groove 11 into which fit the vertical posts 2 and 3 of the car frame as clearly indicated in Fig. 3. The inner vertical face of each of the side timbers is provided with a vertical groove 12. The body of my grain car door is formed by a series of sections 13 which fit at their ends into the grooves 12, these sections extending crosswise of the door and resting one upon the other. Each section 13 is divided intermediately of its length at 14, the divided portions being connected together by hinge 15. The hinge 15 as will be clearly seen in Fig. 3 is secured to the inner face of each section. In order to lock the portions of the sections so that they will extend rigidly across the door, I have provided a bar 16 which is pivotally connected at 17 to one of these sections. The bar 16 extends across the joint between the two sections longitudinally of the sections and is secured at its opposite end by means of a cross plate 18 provided with a notched projection 19 into the notch of which the free end of the bar 16 extends. 20 is a securing screw which extends through an orifice in the projection 19 through the bar 16 into the plate 18 thereby securely holding the bar 16 in place. The lowermost sections 13 are connected together by chains 21 the ends of which are suitably secured in proximity to the opposing edges of two adjacent sections. As will be clearly seen on referring to Fig. 1 a chain 21 is provided at each end of each connected section. The grain door is secured to the top plate 4 of the car frame by means of hinges 22, the upper leaf of which is secured to the plate 4. The lower leaf depends below the plate 4 against the inner face of the top timber 7 of my grain car door. The lower leaf of the hinge 22 is provided with a depending tongue 23. 24 is a strap which is secured to the timber 7 and straddles the tongue 23 as clearly indicated in Fig. 4. The strap 24 is provided with an orifice 25 through which and an orifice 26 formed in the tongue 23 extends a securing screw 27. 28 is a supplemental orifice formed in the tongue 23 in vertical alignment with the orifice 25. When it is desired to unload the car all it is necessary to do is to remove the screw 20 of the lowermost section 13 and swing the bar 16 upward so that the section 13 breaks joint in an outward buckling movement as indicated by dotted lines in Fig. 3. This lowermost section is forced entirely out of the car door opening and is then held in a suspended position by the chains 21 connecting it to the next uppermost section. If the pressure of the grain or other contents of the car is not sufficiently removed the next uppermost section 13 may be removed in a similar manner.

When the car door is not in use I first remove the screw 27 and then force the door 5 upward by means of a crow bar so that the strap 24 and its orifice 25 is carried upward from a position opposite the orifice 28 into a position opposite the orifice 26. The screw 27 is then reinserted holding my grain car door clear of the car floor. My grain car door may be then swung upward into the dotted line position shown in Fig. 2 and held in such position by means of the depending hook 29 which is carried by the car roof and said hook engages beneath the lateral edge of the grain car door.

From this description it will be seen that I have devised a very simple construction of grain car door which may be very easily operated to relieve the pressure of the grain or other commodity within the car when starting to unload and at the same time providing a grain car door in which there is no danger of the removed parts becoming lost.

What I claim as my invention is:

A grain car door adapted to be opened by the outward pressure of grain within the car, comprising a frame structure having rabbet grooves in the outer vertical edges adapted to fit the inner vertical edges of two adjacent vertical car timbers and having vertical grooves in the inner opposing faces of the vertical portions of the frame, a series of door sections extending crosswise of the door and fitting at their end edges into the aforesaid opposing grooves and divided vertically intermediately of their length into two portions, a hinge secured to the inner face of each section to connect the aforesaid portions together, a locking bar pivotally secured to one of such portions and a keeper member secured to the other of such portions, and means for locking the free end of the locking bar within the keeper member so that it extends crosswise at the joint between the aforesaid section portions.

ARTHUR COULSON WATSON.

Witness:
 CLARENCE T. MURPHEY.